Nov. 23, 1937.    J. E. MITCHELL    2,100,300
COTTON CLEANING AND RECLAIMING MACHINE
Filed May 14, 1936
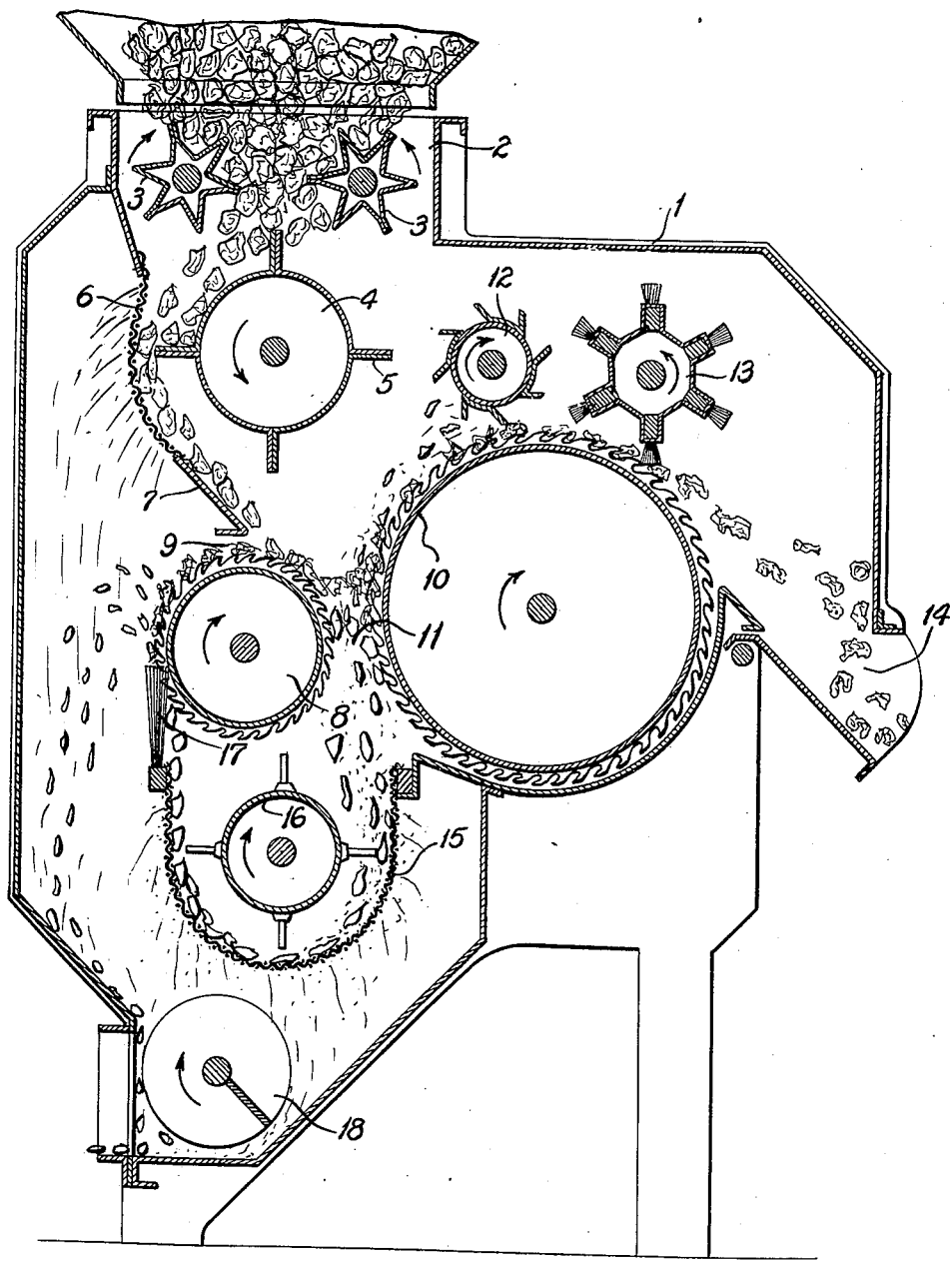
INVENTOR:
JOHN E. MITCHELL
BY Bruce D. Elliott
ATTORNEY Registered Nov. 23, 1937

2,100,300

UNITED STATES PATENT OFFICE 2,100,300

COTTON CLEANING AND RECLAIMING MACHINE

John E. Mitchell, Dallas, Tex.

Application May 14, 1936, Serial No. 79,647

14 Claims. (Cl. 19—37)

The general object of this invention is to provide novel and effective means for cleaning cotton, and in so doing to recover the maximum amount of cotton from a mixture of cotton and hulls fed into the machine. The invention is more particularly designed as an improvement on the means for reclaiming cotton escaping with hulls past a main cotton extracting cylinder disclosed in the machine of my prior Patent No. 1,613,242, dated January 4, 1927.

In the machine of this prior patent, the mixture of cotton and hulls is delivered onto a main extracting saw cylinder which operates to extract the major portion of the cotton from the mixture, and the usual doffer is employed for removing this cotton from the cylinder. A certain amount of small lock cotton, however, escapes past the extracting cylinder with the hulls, and a small reclaiming saw cylinder is employed for recovering this escaping cotton. The reclaiming cylinder rotates in contact with yielding members which operate to press the lock cotton into engagement with the teeth of the cylinder, but do not exert sufficient pressure to cause the teeth of the cylinder to engage the hulls, which are accordingly discharged by centrifugal action after passing beneath the yielding members. These yielding members are preferably in the form of brushes, or a continuous line of bristles, and I prefer to employ such type of yielding member in the present invention. After the reclaiming cylinder has recovered the escaping cotton, it is necessary to remove the same from the cylinder and, preferably, to return it to the main extracting cylinder so that it may be combined with the main body of cotton extracted by this cylinder. For this purpose my patent discloses a small rotating doffer cylinder which operates to project the cotton removed from the reclaiming cylinder onto the main extracting cylinder, or, alternatively, the reclaiming saw cylinder may be mounted in doffing relation to the main extracting cylinder; or, again, both of these means may be employed for removing the cotton from the reclaiming cylinder and returning it to the extracting cylinder, and this latter arrangement is shown in the patent.

Arranging the main saw cylinder so that it will doff the reclaiming saw cylinder presents a very simple construction; but it has the disadvantage that any hulls jumping across the gap following the brushes and carried up by the reclaiming saw cylinder must pass through the narrow space between the two saw cylinders and are more or less cut or chipped by the teeth of the cylinders, and these small hull particles become entangled with the cotton and are difficult to remove.

The chief characteristic of the present invention is that the reclaiming saw cylinder is mounted in such relation to the extracting saw cylinder and to the incoming stream of mixed cotton and hulls to be cleaned, that small lock cotton recovered from the hulls by the lower portion of the reclaiming cylinder is swept or doffed from the upper portion of the cylinder by the incoming stream of mixed cotton and hulls, which is directed across the upper portion of the reclaiming cylinder in the same direction that the cylinder rotates but at a greater velocity than the teeth of the saws are moving, so that the locks of cotton are doffed from the reclaiming cylinder and returned to the extracting cylinder without the necessity for either doffing the reclaiming cylinder by the extracting cylinder, or for providing any other mechanical means for doffing the reclaiming cylinder.

Another outstanding characteristic of the invention is that the extracting and reclaiming cylinders are mounted in such relation to each other that when both cylinders are rotated in the same direction, the down-going side of the reclaiming cylinder on the one side, and the rising side of the extracting cylinder on the other, define a space through which hulls may freely discharge from the extracting zone, or from the point where the mixed cotton and hulls are projected into contact with the rising side of the extracting cylinder.

A still further object of the invention is to agitate the escaped hulls over a screen to remove the small trash and subsequently to deliver the hulls, with any small lock cotton, into contact with the lower rising side of the reclaiming cylinder at a point in advance of the yielding members or brushes, which latter cause the small lock cotton to be engaged by the teeth of the reclaiming cylinder while the hulls are thrown out over the top of the yielding members.

In the machine of the present invention, a hull board member, the upper portion of which is in the form of a curved screen has its lower imperforate portion directed tangentially to the upper down-going side of the reclaiming cylinder and terminates at a suitable distance above the top of the cylinder, and a directing cylinder, rotating at relatively high velocity is employed to project the stream of mixed cotton and hulls quite rapidly down the hull board and over and in contact with the upper down-going portion of the reclaiming cylinder, and then into contact with the rising side of the main extracting cylinder. Thus, the mechanical means for projecting and directing the stream of mixed cotton and hulls over and in contact with the surface of the reclaiming cylinder on its way to the extracting cylinder constitute a means necessarily functioning in the operation of the machine in cleaning cotton to doff the recovered cotton from the reclaiming cylinder, and this operation constitutes the vital feature of the invention.

The invention is illustrated in the accompanying drawing in which—

The figure is a cross-sectional view of a machine embodying my invention, the conventional driving means for the various rotary elements being omitted and the direction of rotation of these members being indicated by arrows applied thereto.

Referring to the drawing, the numeral 1 indicates a casing having an inlet opening, 2, at its upper end, within which opening are mounted two similar feed-rollers, 3, of conventional construction and operating to feed a regulated stream of mixed cotton and hulls into the machine. Located beneath these rollers is a directing cylinder, 4, having longitudinal blades, 5, which operate in the rotation of the cylinder, to sweep the incoming stream of mixed cotton and hulls over a curved screen, 6, to remove dirt and small particles of trash therefrom and to cause the cotton to be projected over a hull board, 7, which extends in a straight line from the lower side of the screen 6, in a manner to be positioned substantially tangential to the surface of a small reclaiming saw cylinder, 8, but terminating at a suitable distance above the upper side of this cylinder in order to provide a clearance space, 9, through which cotton recovered by the reclaiming cylinder, as hereinafter explained, may be carried in the rotation of the cylinder. The screen 6 and hull board proper 7 constitute what I have referred to in certain claims as a hull board member. The directing cylinder 4 is rotated at high velocity and operates to propel the mixed cotton and hulls at relatively high speed over the hull board member which by its position and inclination serves to direct the stream of mixed cotton and hulls over a portion of the surface of the reclaiming cylinder 8 and then on to the surface of the main extracting saw cylinder, 10. The reclaiming cylinder 8 and extracting cylinder 10 are mounted to rotate in the same direction, as indicated by the arrows applied to these cylinders, but are separated a suitable distance to provide between them a passage, 11, through which hulls and locks of cotton not engaged by the teeth of the extracting cylinder may escape. A kicker-roll, 12, is associated with the extracting cylinder for knocking back hull particles carried up by the extracting cylinder, and a doffer cylinder, 13, operates to doff cotton from the extracting cylinder through a cotton discharge opening, 14, the parts just described being of conventional construction and operating in a well-known manner. In order to recover any cotton escaping through the passage 11 with the rejected hulls, the following construction is provided.

Mounted in the casing at a suitable distance below the hull board discharge passage 11 is a substantially semi-circular screen, 15, and mounted within the screen to rotate in cooperative relation with the curved wall thereof is a bladed beating cylinder, 16, which operates in the usual manner to sweep the hulls and cotton particles over the screen to remove dirt and trash particles therefrom, and in addition functions to throw the hulls and any small locks of cotton upward into engagement with the lower side portion of the reclaiming cylinder remote from the extracting cylinder, and which it will be seen by the arrow on the cylinder is the rising side thereof. Secured in the casing to extend upward from the far side of the screen 15 is a yielding member, 17, which is preferably in the form of a brush member extending longitudinally of the reclaiming cylinder with its upper end portion yieldingly engaging the side of the cylinder.

In the operation of the reclaiming mechanism described the hulls and cotton locks thrown upward by the beating cylinder 16 into engagement with the under far side of the reclaiming cylinder 8 are engaged by the teeth of said cylinder and carried under the brushes 17. These latter force the cotton into engagement with the teeth so that it will be carried around with the cylinder, but the pressure of the brushes is not sufficient to force the hulls into engaging relation with the teeth, so that the hulls and hull particles will be thrown outward by the cylinder by centrifugal action as they pass from under the yielding member.

As heretofore stated, the salient feature of my invention consists in the novel means I employ for doffing the recovered cotton from the reclaiming cylinder 8. With the above description of the reclaiming mechanism in mind, it will be seen, by examining the drawing, that the reclaiming cylinder will carry the recovered cotton around until it cuts the path of the stream of cotton being projected from the hull board 8 toward the extracting cylinder 10. This stream of cotton has a speed of movement considerably in excess of the surface movement of the reclaiming cylinder, and as it engages the reclaiming cylinder on the upper down-going side thereof, the result follows that the cotton locks engaged by the teeth of the reclaiming cylinder will be brushed or swept off of the cylinder by the rapidly moving stream of cotton and carried along with the same into engagement with the extracting cylinder on the rising side thereof within the zone of the passage 11 provided for the escape of hulls past said cylinder. Thus, while the mechanical element described comprising the directing cylinder, the hull board member, the extracting cylinder, the reclaiming cylinder, the beating cylinder and the brush member all cooperate in the reclaiming and recovery of the escaping cotton, it is essentially the relation of the hull board to the reclaiming cylinder and of the latter to the extracting cylinder which accomplishes the actual doffing of the recovered cotton by insuring that in the operation of the machine the directed stream of cotton shall sweep over the down-going side of the reclaiming cylinder and remove therefrom any recovered cotton and carry it along to the extracting cylinder.

Dirt, trash and the like passing through screens 6 and 15 fall down into a trash conveyor, 18, at the bottom of the casing and are discharged from the machine.

I claim:

1. A cotton cleaning machine comprising, in combination, a rotatable extracting saw cylinder for receiving mixed cotton and hulls fed into the machine, a reclaiming saw cylinder for recovering any cotton escaping with hulls past the extracting cylinder and mounted to rotate in the same direction as the extracting cylinder at a distance therefrom, and means for projecting a stream of the mixed cotton and hulls over and in contact with one side of the reclaiming saw cylinder and toward the extracting cylinder to thereby doff any recovered cotton from the reclaiming cylinder and deliver it, along with the mixed cotton and hulls, to the extracting cylinder.

2. A cotton cleaning machine comprising, in combination, a rotatable extracting saw cylinder for receiving mixed cotton and hulls fed into the machine, a reclaiming saw cylinder for recovering any cotton escaping with hulls past the extracting cylinder and mounted to rotate in the same direction as the extracting cylinder at a distance therefrom, and means for projecting a stream of the mixed cotton and hulls over and in contact with a side of the reclaiming saw cylinder and toward the extracting cylinder to thereby doff any recovered cotton from the reclaiming cylinder and deliver it, along with the mixed cotton and hulls, onto a side of the extracting cylinder moving in an opposite direction to the opposed side of the reclaiming saw cylinder.

3. A cotton cleaning machine comprising, in combination, a rotatable extracting saw cylinder for receiving mixed cotton and hulls fed into the machine, a reclaiming saw cylinder for recovering any cotton escaping with hulls past the extracting cylinder and mounted to rotate in the same direction as the extracting cylinder at a distance therefrom, and means for projecting a stream of the mixed cotton and hulls over and in contact with a side of the reclaiming saw cylinder in the direction of movement thereof but at greater velocity and toward the extracting cylinder to thereby doff any recovered cotton from the reclaiming cylinder and deliver it, along with the mixed cotton and hulls to the extracting cylinder on a side thereof moving in a direction opposite to that of the opposed side of said reclaiming cylinder.

4. A cotton cleaning machine comprising, in combination, an extracting saw cylinder and a reclaiming saw cylinder mounted to rotate in the same direction in separated relation, means for delivering a stream of mixed cotton and hulls to the rising side of the extracting cylinder and directing said stream, intermediate its course, over and in contact with the down-going side of the reclaiming saw cylinder, the latter being adapted to recover any cotton escaping with hulls past the extracting cylinder and to have such cotton doffed therefrom by the directed stream of cotton and hulls on its way to the extracting cylinder.

5. A cotton cleaning machine comprising, in combination, an extracting saw cylinder and a reclaiming saw cylinder mounted to rotate in the same direction in separated relation, means for delivering a stream of mixed cotton and hulls to the rising side of the extracting cylinder and directing said stream, intermediate its course, tangentially to and in contact with the down-going side of said reclaiming saw cylinder, the latter being adapted to recover any cotton escaping with hulls past the extracting cylinder and to have the same doffed therefrom by the directed stream of cotton and hulls on its way to the extracting cylinder.

6. A cotton cleaning machine comprising, in combination, an extracting saw cylinder and a reclaiming saw cylinder mounted to rotate in the same direction in separated relation, means for delivering a stream of mixed cotton and hulls to the rising side of the extracting cylinder and propelling and directing said stream at high speed over and in contact with the down-going side of said reclaiming saw cylinder, the latter being adapted to recover any cotton escaping with hulls past the extracting cylinder and to have the same doffed therefrom by the directed stream of cotton and hulls on its way to the extracting cylinder.

7. A cotton cleaning machine comprising, in combination, a main extracting saw cylinder adapted to receive a directed stream of mixed cotton and hulls on its rising side, a reclaiming saw cylinder positioned to provide a space for the escape of hulls past the extracting cylinder, yielding members cooperating with said reclaiming cylinder, means for delivering the escaped hulls and any locks of cotton escaping therewith into contact with the teeth of the reclaiming cylinder at a point in advance of said yielding members, and means functioning in the operation of the machine to cause the locks of cotton to be doffed from the upper portion of the reclaiming cylinder by the directed stream of cotton and hulls and returned to the extracting cylinder.

8. A cotton cleaning machine comprising, in combination, a main extracting saw cylinder adapted to receive a directed stream of mixed cotton and hulls on its rising side, a reclaiming saw cylinder positioned to provide a space for the escape of hulls past the extracting cylinder, yielding members cooperating with said reclaiming cylinder, a rotatable member for delivering the escaped hulls and any locks of cotton escaping therewith into contact with the lower portion of the reclaiming cylinder at a point in advance of said yielding members, and means functioning in the operation of the machine to cause the locks of cotton to be doffed from the upper portion of the reclaiming cylinder by the directed stream of cotton and hulls and returned to the extracting cylinder.

9. A cotton cleaning machine comprising, in combination, a main extracting saw cylinder adapted to receive a directed stream of mixed cotton and hulls on its rising side, a reclaiming saw cylinder positioned to provide a space for the escape of hulls past the extracting cylinder, a rotatable member positioned below said reclaiming cylinder for delivering the escaped hulls and any locks of cotton escaping therewith into contact with the teeth of the reclaiming cylinder, a screen surrounding the lower portion of said rotary member, and means functioning in the operation of the machine to cause the locks of cotton to be doffed from the upper portion of the reclaiming cylinder by the directed stream of cotton and hulls and returned to the extracting cylinder.

10. A cotton cleaning machine comprising, in combination, a main extracting saw cylinder adapted to receive mixed cotton and hulls fed into the machine on its rising side, a reclaiming saw cylinder mounted for recovering on its lower rising portion cotton escaping with the hulls past the extracting cylinder, and means for directing the inflowing stream of mixed cotton and hulls in such manner that the down-going portion of the reclaiming cylinder will be swept by the stream of mixed cotton and hulls and have the recovered cotton doffed from its teeth and returned to the extracting cylinder.

11. A cotton cleaning machine comprising, in combination, a main extracting saw cylinder adapted to receive a regulated stream of mixed cotton and hulls fed into the machine on its rising side, a reclaiming saw cylinder mounted for recovering on its lower portion cotton escaping with the hulls past the extracting cylinder, and means for directing the regulated stream of mixed cotton and hulls in such manner that the down-going portion of the reclaiming cylinder will be swept by the stream of mixed cotton and hulls on its way to the extracting cylinder and have the recovered cotton doffed from its teeth and returned to the extracting cylinder.

12. A cotton cleaning machine comprising, in combination, an extracting saw cylinder and a reclaiming saw cylinder mounted to rotate in the same direction at such distances apart as to provide a hull discharge space between the down-going side of the reclaiming cylinder and the rising side of the extracting cylinder, the reclaiming cylinder being adapted to recover any cotton escaping with hulls past the extracting cylinder, and means for directing the in-coming stream of mixed cotton and hulls fed into the machine so that it first serves to sweep any cotton from the teeth of the reclaiming cylinder and afterwards passes into contact with the extracting cylinder within the hull discharge space between the two cylinders.

13. A cotton cleaning machine comprising, in combination, feeding means for delivering a stream of mixed cotton and hulls to the machine, an extracting saw cylinder and a reclaiming saw cylinder mounted to rotate in the same direction at such distance apart as to provide a hull discharge space between the down-going side of the reclaiming saw cylinder and the rising side of the extracting cylinder, a hull board member having its lower portion directed substantially at a tangent to the surface of the reclaiming saw cylinder but terminating above the same, and a directing cylinder located below the feeding means and cooperating with said hull board member and operating to project the stream of mixed cotton and hulls at relatively high velocity over said hull board member and over and into contact with the surface of said reclaiming saw cylinder whereby to sweep from the teeth of the latter any recovered cotton and carry the same along with the stream of mixed cotton and hulls into contact with the extracting cylinder within the hull discharge space between the two cylinders.

14. A cotton cleaning machine comprising, in combination, an extracting saw cylinder and a reclaiming saw cylinder mounted to rotate in the same direction in separated relation to provide a hull discharge space between them, means for delivering a stream of mixed cotton and hulls to the rising side of the extracting cylinder and directing said stream intermediate its course over and in contact with the down-going side of the reclaiming saw cylinder, a curved screen located below said hull discharge space, a rotary member mounted within the same and operating to project hulls and cotton falling into said screen upward against the under rising side of the reclaiming saw cylinder, yielding members extending upward from the outer termination of said screen and bearing at their upper ends against the surface of the rising side of said reclaiming saw cylinder, said directed stream of cotton operating to sweep from the teeth of the reclaiming cylinder any recovered cotton and to carry the same along to the extracting cylinder in the space provided for the discharge of hulls.

JOHN E. MITCHELL.